United States Patent
Gille et al.

(10) Patent No.: US 7,140,968 B2
(45) Date of Patent: Nov. 28, 2006

(54) UNIVERSAL JOINT WITH A SECURING ELEMENT

(75) Inventors: Wilfried Gille, Dorsten (DE); Andreas Wons, Moers (DE)

(73) Assignee: Spicer Gelenkwellenbau GmbH & Co. KG (DE)

( * ) Notice: Subject to any disclaimer, the term of this patent is extended or adjusted under 35 U.S.C. 154(b) by 0 days.

(21) Appl. No.: 10/738,600

(22) Filed: Dec. 17, 2003

(65) Prior Publication Data

US 2004/0127296 A1 Jul. 1, 2004

(30) Foreign Application Priority Data

Dec. 20, 2002 (DE) ................... 102 61 114

(51) Int. Cl.
 *F16D 3/40* (2006.01)
(52) U.S. Cl. ...................... 464/130; 464/136
(58) Field of Classification Search ............... 464/128, 464/130, 136, 127
See application file for complete search history.

(56) References Cited

U.S. PATENT DOCUMENTS

| | | | |
|---|---|---|---|
| 1,993,357 A | * | 3/1935 | Braun et al. ............... 464/130 |
| 2,512,690 A | | 6/1950 | Smith et al. |
| 2,773,368 A | | 12/1956 | Slaught |
| 2,869,341 A | | 1/1959 | Gnambs |
| 4,861,314 A | | 8/1989 | Mazziotti |
| 5,746,658 A | * | 5/1998 | Duggan et al. ............. 464/130 |

FOREIGN PATENT DOCUMENTS

| | | |
|---|---|---|
| CH | 358633 | 1/1962 |
| DE | 3446456 | 6/1986 |

* cited by examiner

*Primary Examiner*—Greg Binda
(74) *Attorney, Agent, or Firm*—MacMillan, Sobanski & Todd, LLC

(57) ABSTRACT

A universal joint includes two joint yokes that, respectively, have two yoke arms that each start from a connection portion. Through an eye portion distanced from the connection portion, bearing bores extend in which respectively, a journal of a journal cross by means of interposition of rolling members and of a bearing bushing are supported. On the outside of the yoke arms, a bulge is respectively provided towards the connection portion and adjacent to the bearing bore and over a partial circumference of the same, which bulge has, towards the bearing bore, a groove. A circumferential groove, belonging to a retaining trunnion projecting from the base of the bearing bushing, is arranged opposite to the groove. Between the two, a securing element is arranged that engages with an engagement portion in the groove and with a retaining portion facing away from the same, in the circumferential groove of the retaining trunnion. As the groove for receiving the securing element, which serves for the retainment of the bearing bushing in the bearing bore, is not designed to extend circumferentially fully around the bearing bore, the material thickness on the free end of the yoke arms can be reduced on the outside.

12 Claims, 4 Drawing Sheets

UNIVERSAL JOINT WITH A SECURING ELEMENT

BACKGROUND OF THE INVENTION

The invention relates to a universal joint with a securing element that serves to secure a bearing bushing supporting a journal cross and that is received in a bearing bore of a yoke arm of a joint yoke.

German Patent No. 34 46 456 C1 describes an axial retainment of a bearing bushing in a yoke eye of a joint yoke of a universal joint. Adjacent to the bearing bore, in an area of the same projecting to the outside over the base of the bearing bushing, an annular groove extending over the complete circumference is provided. On two diametrically opposite positions of the eye portion, a groove is respectively provided, into which a securing ring, formed in cross-section as an angle ring with projections, can be inserted and can then be turned for the retainment so that the projections engage in the groove. The securing of the ring against rotation is then carried out by means of a grub screw. Thus, for the securing ring, a type of bayonet locking is selected.

When articulating the joint yokes of a universal joint relative to each other, the yoke arms of the one joint yoke engage mutually in a gap between the yoke arms of the other joint yoke. The yoke arms of a joint yoke are connected to a connection portion. The yoke arms project from the connection portion of the joint yoke in an offset manner relative to the longitudinal axis. The free ends of the yoke arms dip, respectively, into the gap between the yoke arms of the other joint yoke. The larger the distance of the outer contour of the yoke arms in the area of their ends distanced to the connection portion from the articulation center of the joint, the larger is the rotational circle when articulating the two joint yokes to each other. Basically, it is necessary especially for the universal-jointed shafts, designed for a high capacity of torque, to design the individual joint yokes of a universal joint to be as compact as possible, i.e., to keep the rotational diameter as small as possible.

Therefore, the invention has the object to provide a universal joint that, when maintaining the capacity of articulation of the joint yokes of the universal joint to each other, is formed more compact, i.e., has a smaller rotational diameter.

SUMMARY OF THE INVENTION

The object is solved according to the invention by a universal joint having two joint yokes respectively centered on a longitudinal axis and having, respectively, a connection portion, having, respectively, two yoke arms, starting, respectively, from the connection portion and which end, respectively, in an eye portion, distanced to the connection portion and off-set from the longitudinal axis in opposite directions, and having, respectively, a through extending bearing bore, arranged at a right angle to the longitudinal axis on a bore axis, and wherein both yoke arms of at least one of the joint yokes are provided on the outside with a bulge on a partial circumference of the bearing bore towards the connection portion and arranged symmetrically to a parallel line to the longitudinal axis through the bore axis, which bulge towards the bearing bore is provided with a groove, a journal cross, having four journals, arranged in pairs on a journal axis and which journal axes are arranged at a right angle to each other, bearing bushings, supporting the journals and respectively, received in a bearing bore of one of the yoke arms, closed by a base and to which, respectively, a retaining element is arranged, and a securing element for each bearing bushing, having an engagement portion, engaging in the groove of the bulge of the corresponding yoke arm, which, together with the retaining element holds the bearing bushing axially in an unmovable manner.

Of advantage in this embodiment is that in the area of the eye portion of the yoke arms of a joint yoke, material can be saved, in which in a conventional design, a securing ring engages in a groove, i.e., which determines the rotational diameter when articulating the joint yokes relative to each other. As the retainment can be arranged distanced to the free ends of the yoke arms, it is possible to achieve in total a more compact design, i.e., to reduce the rotational diameter especially under articulation so that no reduction of the torque capacity occurs at the same angle of articulation as before. For this, as the ideal condition, it is aspired that the journal cross bearing determined layout-wise by the predetermined torque limits by means of the bearing bushings the rotational diameter, in that the joint yokes extend at their free ends with their outer contour offset towards the longitudinal axis. Also, the width of the bulge can be designed such, that the rotational diameter is not negatively influenced.

The retaining element can diversely be formed for the retainment of the bearing bushing in connection with the securing element and the groove in the bulge.

Preferably, it is provided that the groove is formed, respectively, as a circular arc groove, centered on the bore axis or on an axis parallel thereto.

Alternatively, it is provided that the groove is formed straight and intersects the parallel line at a right angle.

A first embodiment of the retainment provides that the retaining element comprises a retaining trunnion projecting from the base of the bearing bushing to the outside and centered on the bore axis and the retaining trunnion having a circumferential groove. In this case, the circumferential groove can be arranged concentrically to the circular arc groove.

A first embodiment of the securing element provides that the securing element comprises a through bore through which the retaining trunnion extends, wherein the securing element is retained by a securing ring, engaging in the circumferential groove of the retaining trunnion and engaging with its engaging portion in the groove of the bulge. Preferably, it is provided for the circular arc groove that it extends over an arc of approximately 90° in reference to the bore axis of the bearing bore. In this area, the rotational diameter is not influenced by the size of the bearing bushing. Furthermore, the support in this area is sufficient for taking up the axial forces.

A further embodiment of the securing element provides that the securing element is formed like an annulus. In this case, it is preferably provided that the securing element comprises an arc portion, forming the arc-like engagement portion and which engages in the groove of the bulge formed as a circular arc groove, comprises at least one retaining portion engaging in the circumferential groove of the retaining trunnion and comprises the connection portions connecting the end(s) of the retaining portion(s) to the ends of the arc portion.

In a first design variant of this securing element, a continuous retaining portion is provided so that the arc portion, the connection portions, and the retaining portion are continuous with each other.

The retaining portion and the arc portion are formed to deform elastically towards each other and are respectively provided with an eyelet for the engagement by a tool. This tool can, for example, be formed similar to a collet chuck for spring rings. In this case, it can be provided that the arc portion and the retaining portion(s) are arranged in one plane, or in planes offset to each other, and are arranged distanced to each other elastically movable towards each other.

A second embodiment for the securing element provides that two retaining portions are provided wherein, on the free ends of the retaining portions, an eyelet for the engagement by a tool is provided, respectively.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
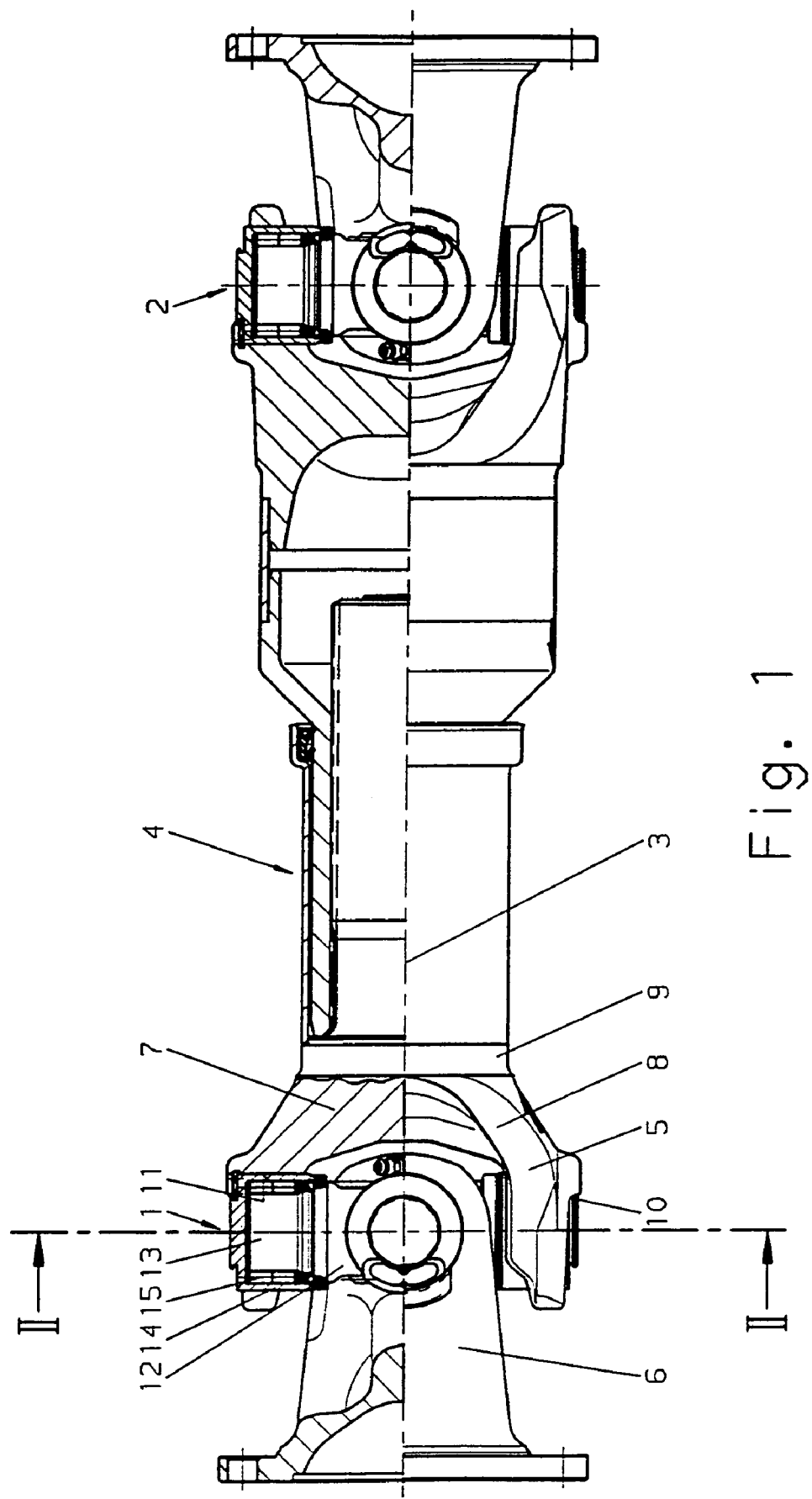
FIG. 1 is a side view of a universal joint shaft, half in view and half in section, wherein the universal joints are shown in aligned position.
Figure 2:
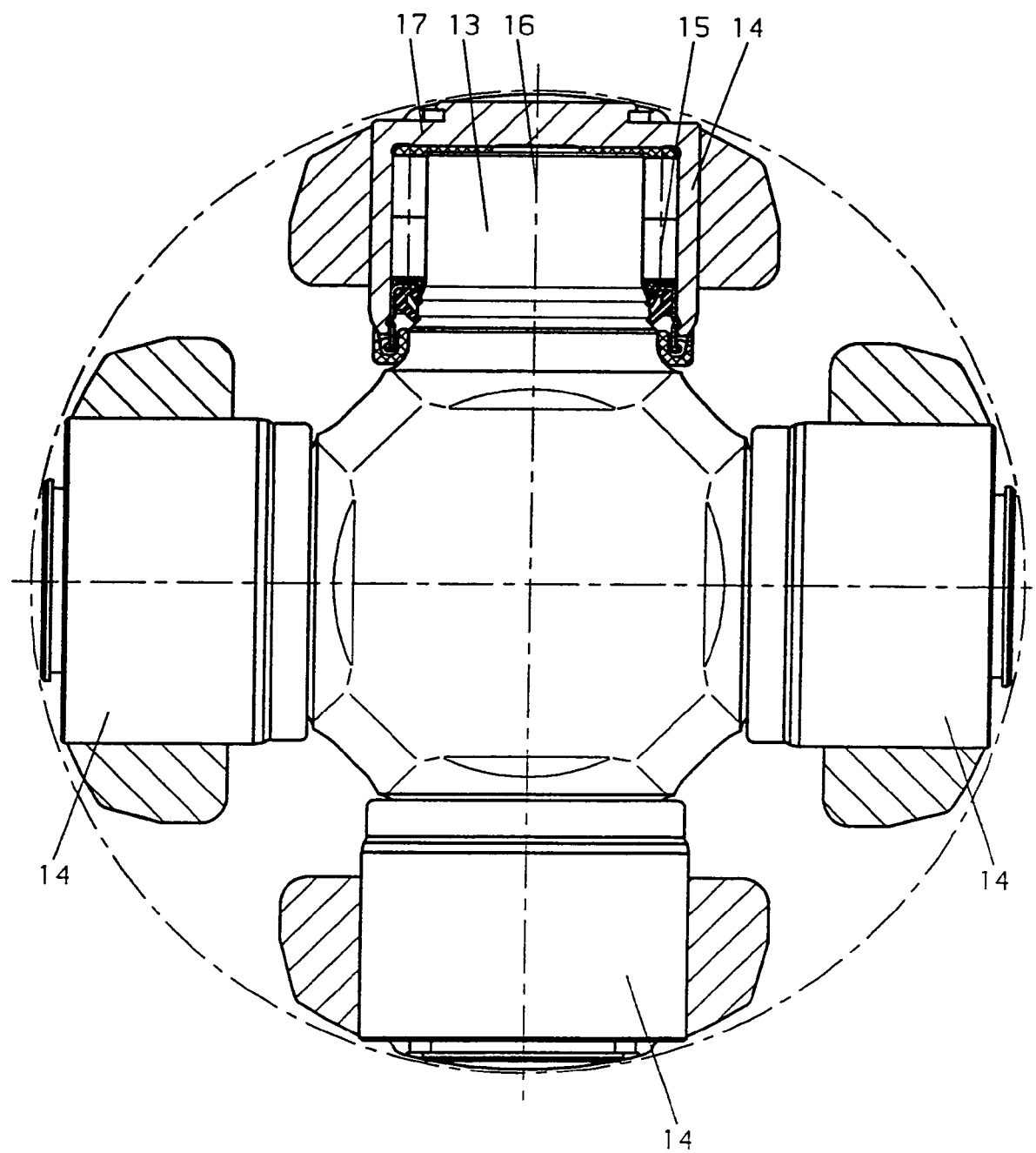
FIG. 2 is an enlarged sectional view taken along line II—II of FIG. 1.

FIG. 1 shows a universal joint shaft having a first universal joint 1 and a second universal joint 2, as well as a telescopic arrangement 4 between the two universal joints 1 and 2 that enables a change of position of the same along a longitudinal axis 3. FIG. 2 shows a sectional view of FIG. 1 in an enlarged scale. The universal joints 1 and 2 are shown in the aligned position, i.e. at an articulation angle of 0°. Thus, all of the components are aligned on the longitudinal axis 3.

As, in principal, the same design is given for the two universal joints 1 and 2, with the exception of their connections to the telescopic arrangement 4, a description of the invention is given by means of the first universal joint 1. The first universal joint 1 consists of a first joint yoke 5 and a second joint yoke 6. The first joint yoke 5 has a connection portion 9 from which two yoke arms extend, namely, a first yoke arm 7 and the second yoke arm 8. The two yoke arms 7 and 8 are arranged distanced to the longitudinal axis 3, i.e., they are diametrically offset from this longitudinal axis 3 in opposite directions. Each of the two yoke arms 7 and 8 has an eye portion 10 on the end distanced from the connection portion 9. The eye portions 10 have a bearing bore 11 that extends at a right angle to the longitudinal axis 3; The bearing bores 11 of the two yoke arms 7 and 8 are arranged on a common bore axis 16, as best shown in FIG. 2. It is also visible from FIG. 2 that in the bearing bores 11 with the bore axis 16, two journals 13 of a journal cross 12 (having a total of four journals 13) are received. The axes of the four journals 13 are arranged in one plane. The journals 13 extend at right angles relative to each other.

The support of the journal cross 12 in the bearing bore 11 is achieved by means of bearing bushings 14 that, by means of interposition of rolling members 15, are rotatably supported on respective trunnions 13. The bearing bushings 14 are, on one side, closed by a base 17.

The design of the second joint yoke 6 corresponds essentially to the design of the first joint yoke 5 with exception of the connections. While the first joint yoke 5 is connected to a stub shaft of the telescopic arrangement 4, the second joint yoke 6 has a flange. The universal joint shaft serves for the transmission of a torque and is designed for high torques. Such high capacity universal shafts are, for example, used in drives of rolling mills.

By means of FIGS. 3 to 9, a detailed description of the different embodiments for the securing of the bearing bushing 14 in the bearing bore 11 is given, by means of which it will be obvious that a more compact design can be achieved. The arrangement described in the following in reference to the first yoke arm 5 is also applicable to the further supports.

Figure 3:
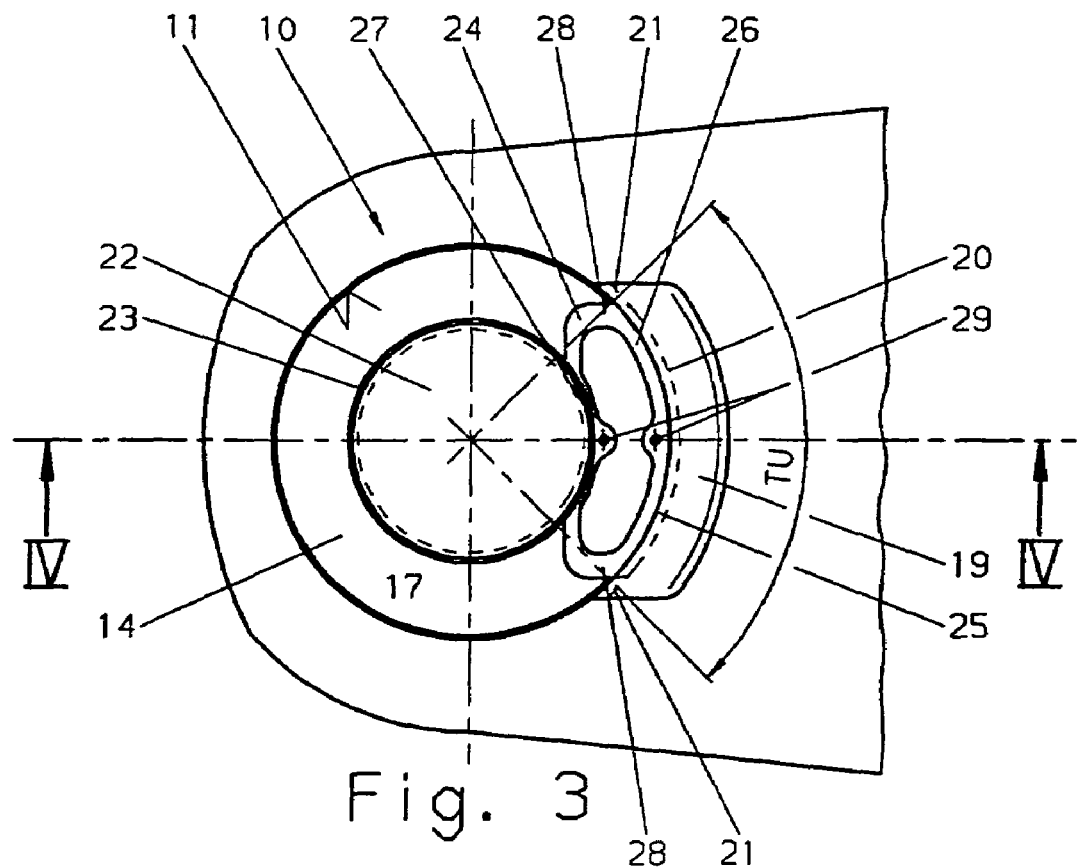
FIG. 3 is a further enlarged top plan of the eye portion of one yoke arm illustrated in FIGS. 1 and 2 showing a first embodiment of a securing element.
Figure 4:
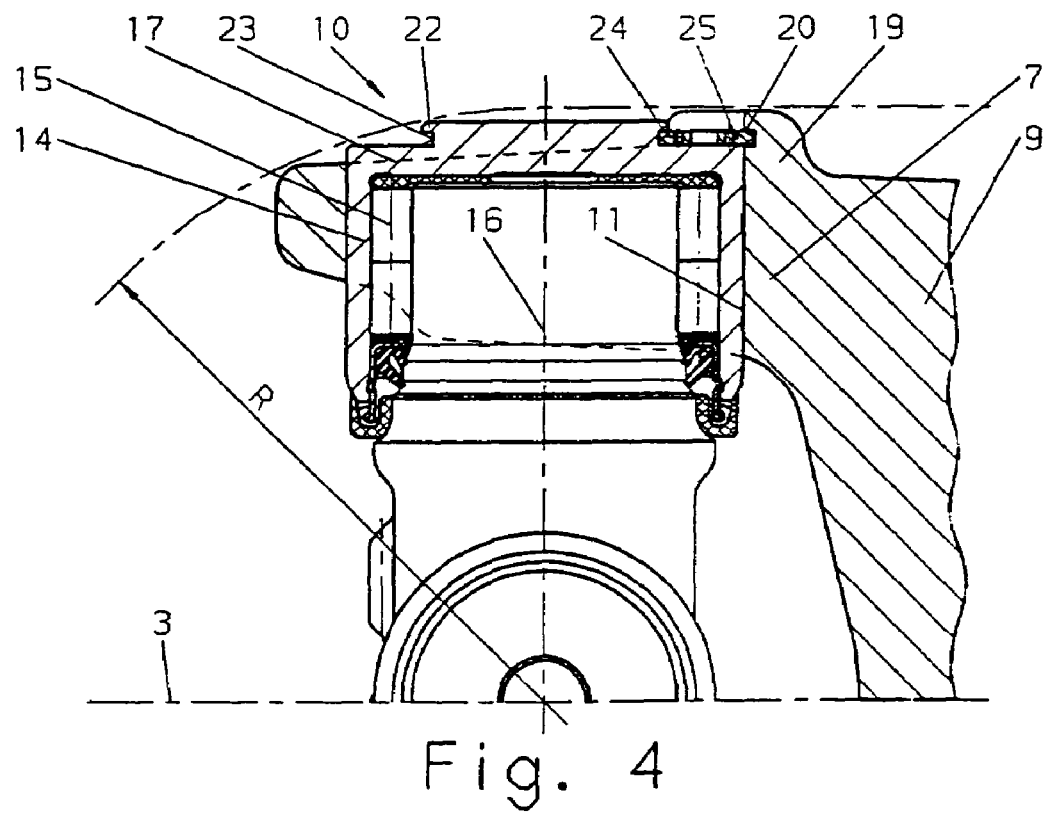
FIG. 4 is a sectional view taken along line IV—IV of FIG. 3.

Firstly, a first embodiment (which is also shown in FIGS. 1 and 2) is described in more detail by means of FIGS. 3 and 4. In the bearing bore 11 formed in the eye portion 10 of the first yoke arm 7, a bearing bushing 14 is received. In the bearing bushing 14, a journal 13 is supported by interposition of rolling members 15. The bore axis 16 shown in FIG. 4 corresponds to the journal axis of the journals 13. Furthermore, the longitudinal axis 3 is shown in FIG. 4. At the intersection point of the bore axis 16 with the longitudinal axis 3, the center of articulation of the first universal joint 1 is arranged. In the eye portion 10 of the first yoke arm 7, a bulge 19 is formed that extends over a partial circumference TU of the bearing bore 11 adjacent to the connection portion 9 on the outside of the yoke arm 7. The bulge 19 has, facing toward the bearing bore 11, a circular arc groove 20 formed therein. The center of this circular arc groove 20 is centered on the bore axis 16 in this embodiment. The bulge 19 is formed symmetrically in reference to a line that extends parallel to the longitudinal axis 3 through the bore axis 16. In other words, the angle formed by the partial circumference TU in reference to the bore axis 16 (90°, for example) is halved by the parallel line. Alternatively, the groove 20 may extend in a straight line that intersects the line at a right angle.

The circular arc groove 20 is limited at the circumferential ends by abutments 21. A retaining trunnion 22 (forming a retaining element) is projectingly formed on the outside on the base 17 of the bearing bushing 14. This retaining trunnion 22 is centered on the bore axis 16 and has a circumferential groove 23 formed therein that is arranged opposite to the circular arc groove 20 when the bearing bushing 14 is installed within the bearing bore 11 of the yoke arm 7. The base 17 of the bearing bushing 14, which is arranged next to the retaining trunnion 22 thereon, is located in the area of the bearing bore 11 of the first yoke arm 7, distanced from the connection portion 9 and slightly outside of the radially outer dimensions of the eye portion 10, which is visible by the represented rotational radius R, i.e., the rotational circle inscribed by the same. It can be seen that the largest radial dimensions are arranged in the area of the bore axis 16.

A securing element 24 is provided for retaining the bearing bushing 14 within eye portion 10 of the yoke arm 7. The securing element 24 includes an arc portion 26 having a front edge that forms an engagement portion 25. The engagement portion 25 extends within the circular arc groove 20 formed in the bulge 19. A securing element 24 also includes a retaining portion 27 that extends within the circumferential groove 23 formed in bearing bushing 14. A pair of connection portions 28 follow the two ends of the arc portion 26 and connect the retaining portion 27 to the arc portion 26. The arc portion 26 and the retaining portion 27 can be elastically moved relatively to other. If desired, one or more eyelets 29 can be provided on the securing element 24, such as on the arc portion 26 and the retaining portion 27, as illustrated. The eyelets 29 can serve, for example, to facilitate the engagement of a collet chuck that can be used to assist in the mounting or detachment of the securing element 24. So that the securing element 24 cannot be displaced in circumferential direction around the bore axis 16 in the circular arc groove 20 and the circumferential groove 22 and thus can be brought out off contact to the same, the circular arc groove 20 is closed at the ends in reference to its partial circumference by the abutments 21. The abutments 21 can be produced, for example, after the manufacture of the circular arc groove 20 and the first mounting of a securing element 24 by deforming the outer portions of the bulge 19 above the circular arc groove 20.

Alternatively, it is possible to offset the center point of the circumferential groove 23 and the center point of the circular arc groove 20 relative to each other. For example, the center point of the circular arc groove 20 may be not arranged on the bore axis 16, but may be arranged offset from the same in direction away from the bulge 19.

Figure 5:
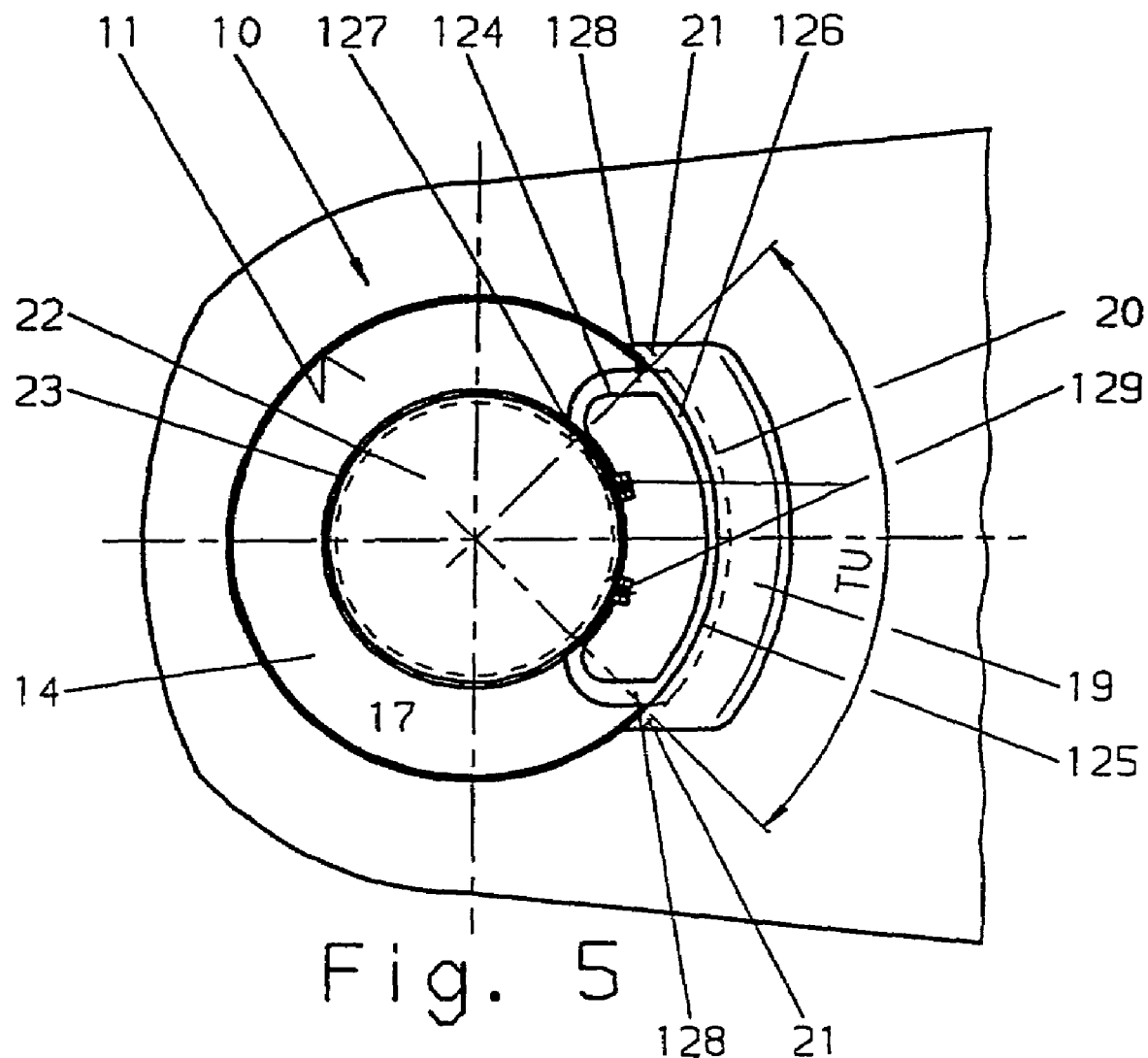
FIG. 5 is an enlarged top plan view similar to FIG. 3 of a second embodiment of a securing element.

FIG. 5 shows a second embodiment for a securing element 124 that is changed in reference to FIGS. 3 and 4 in such a way that a continuously closed annular design is not provided in the securing element 24, as described above. Rather, in a modified securing element 124, two retaining portions 127 are connected via respective connection portions 128 to the ends of an arc portion 126, forming the engagement portion 125. On the ends of the two retaining portions 127, eyelets 129 are provided for the engagement of a tool, as described above. The design of the retaining trunnion 22 with the circumferential groove 23 on the bearing bushing 14 corresponds to the design described in connection with FIGS. 3 and 4. The securing of the securing element 124 is also achieved by the abutments 21 provided on the ends of the circular arc groove 20 formed in the bulge 19 in the same manner as described above.

For the securing elements 24, 124, and also for the later described further securing elements 224, 324, the thicknesses thereof can be selected such, as it is common in connection with securing rings for the assembly of bearing bushings in journal crosses, to produce the necessary or desired clearances.

In all of the embodiments, it is common that the bulge 19 only extends over a partial circumference TU of the bearing bore 11, and the bulge 19 is arranged in a circumferential portion of the bearing bore 11 that is arranged on the outside near the connection portion 9, by which the two yoke arms 7, 8 of the joint yoke 5 are connected to each other, so that in the free end portion of the eye portion 10 of the yokes arm 7, 8 in reference to the longitudinal axis 3, smaller dimensions are achieved, so that the rotational radius R, which the outer edges during articulation of the two joint yokes 5, 6 of the universal joint 1 carry out in reference to each other, is reduced, and therefore, as a whole, a more compact design at a given angle capacity is achieved. Areas are used for the axial retainment of the bearing bushing, which practically do not negatively influence the rotational diameter.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A universal joint comprising:
   two joint yokes respectively centered on a longitudinal axis,
   each of the joint yokes including a connection portion having, respectively, two yoke arms starting from the connection portion and ending with respective eye portions that are distanced to the connection portion and offset from the longitudinal axis in opposite directions, each of the yoke arms having, respectively, a through extending bearing bore that is arranged at a right angle to the longitudinal axis on a bore axis, and wherein both yoke arms of at least one of the joint yokes are provided on the outside with a bulge on a partial circumference of the bearing bore toward the connection portion and arranged symmetrically to a parallel line to the longitudinal axis through the bore axis, which bulge is provided with a groove facing toward the bearing bore, each of the bearing bores extending through both the respective yoke arm and the bulge provided on such respective yoke arm;
   a journal cross having four journals that are arranged in pairs on a journal axis and define journal axes that are arranged at a right angle to each other;
   bearing bushings supporting the journals and respectively received in a bearing bore of one of the yoke arms, each of the bearing bushings being closed by a base to which, respectively, a retaining element is arranged, each of the retaining elements including a retaining trunnion that projects outwardly from the base of the bearing bushing and is centered on the bore axis, each of the retaining trunnions having a circumferential groove formed therein; and
   a securing element for each bearing bushing which, together with the retaining element, holds the bearing bushing axially in an unmovable manner relative to the corresponding yoke arm, each of the securing elements including
   an arc portion that forms an arc-like engagement portion that extends within the groove of the bulge formed as a circular arc groove,
   at least one retaining portion that extends within the circumferential groove of the retaining trunnion, and
   at least one connection portion that connects the at least one retaining portion to the arc portion,
   each of the arc portions and each of the at least one retaining portions being arranged in one plane, arranged distanced to each other, and elastically deformable towards each other.

2. The universal joint according to claim 1 characterized in that each of the circular arc grooves is centered on the bore axis.

3. The universal joint according to claim 1 characterized in that each of the securing elements includes a pair of connection portions that connect the at least one retaining portion to the arc portion, and wherein one continuous retaining portion is provided so that the arc portion, the connection portions, and the retaining portion are continuous with each other.

4. The universal joint according to claim 3 characterized in that the retaining portion and the arc portion are, respectively, provided with an eyelet for engagement by a tool.

5. The universal joint according to claim 1 wherein each of the securing elements has two retaining portions, wherein an eyelet for the engagement of a tool is provided on free ends of each of the retaining portions.

6. A yoke and journal cross assembly for a universal joint comprising:
   a yoke including a connection portion that defines a longitudinal axis and first and second yoke arms that extend from the connection portion and end in respective eye portions that are distanced from the connection portion and offset from the longitudinal axis in opposite directions, each of the eye portions having a bearing bore extending therethrough at a right angle to the longitudinal axis, each of the yoke arms being provided with respective bulges on partial circumferences of the bearing bores toward the connection portion that extend partially about the bearing bores, each of the bulges having a groove formed therein, each of the bearing bores extending through both the respective yoke arm and the bulge provided on such respective yoke arm;

a journal cross having four journals that are arranged in opposed pairs that define respective journal axes that are arranged at a right angle to one other;

a pair of bearing bushings respectively supported on one of the opposed pairs of journals of the journal cross and respectively received in the bearing bores of the yoke arms of the yoke, each of the bearing bushings being closed by a base having a retaining element provided thereon, each of the retaining elements including a retaining trunnion that projects outwardly from the base of the bearing bushing and is centered on the bore axis, each of the retaining trunnions having a circumferential groove formed therein, and a pair of securing elements respectively retaining the bearing bushings to the yoke arms of the yoke, each of the securing elements engaging the retaining element for retaining the bearing bushing in an axially unmovable manner relative to the yoke arms of the yoke, each of the securing elements including an arc portion that forms an arc-like engagement portion that extends within the groove of the bulge formed as a circular arc groove, at least one retaining portion that extends within the circumferential groove of the retaining trunnion, and at least one connection portion that connects the at least one retaining portion to the arc portion, each of the arc portions and each of the at least one retaining portions are arranged in one plane, are arranged distanced to each other, and are elastically deformable towards each other.

7. The universal joint according to claim 6 characterized in that each of the circular arc grooves is centered on the bore axis.

8. The universal joint according to claim 6 characterized in that each of the securing elements includes a pair of connection portions that connect the at least one retaining portion to the arc portion, and wherein one continuous retaining portion is provided so that the arc portion, the connection portions, and the retaining portion are continuous with each other.

9. The universal joint according to claim 8 characterized in that the retaining portion and the arc portion are, respectively, provided with an eyelet for engagement by a tool.

10. The universal joint according to claim 6 wherein each of the securing elements has two retaining portions, wherein an eyelet for the engagement of a tool is provided on free ends of each of the retaining portions.

11. A yoke and journal cross assembly for a universal joint comprising:

a yoke including a connection portion having first and second yoke arms extending therefrom and including respective bearing bores, said first yoke arm being provided with a bulge on a partial circumference of the bearing bore toward the connection portion, said bulge having a groove formed therein that faces toward said bearing bore, said bearing bore extending through both said yoke arm and said bulge provided on said yoke arm;

a journal cross having first and second pairs of journals that are arranged in pairs on a journal axis and define journal axes that are arranged at a right angle to each other;

first and second bearing bushings supporting said first pair of journals and respectively received in said bearing bores of said first yoke arm, said first bearing bushing being closed by a base to which a retaining element is arranged, said retaining element including a retaining trunnion that projects outwardly from the base of the bearing bushing and is centered on the bore axis, said retaining trunnion having a circumferential groove formed therein; and a securing element which cooperates with said retaining element to hold said first bearing bushing axially in an unmovable manner relative to said first yoke arm, said securing element including an arc portion that forms an arc-like engagement portion that extends within the groove of the bulge formed as a circular arc groove, at least one retaining portion that extends within the circumferential groove of the retaining trunnion, and at least one connection portion that connects the at least one retaining portion to the arc portion, the arc portion and the at least one retaining portions being arranged in one plane, arranged distanced to each other, and are elastically deformable towards each other.

12. A yoke and journal cross assembly for a universal joint comprising:

a yoke including a connection portion having first and second yoke arms extending therefrom and including respective bearing bores, said first yoke arm being provided with a bulge on a partial circumference of the bearing bore toward the connection portion, said bulge having a groove formed therein that faces toward said bearing bore, said bearing bore extending through both said yoke arm and said bulge provided on said yoke arm;

a journal cross having first and second pairs of journals that are arranged in pairs on a journal axis and define journal axes that are arranged at a right angle to each other;

first and second bearing bushings supporting said first pair of journals and respectively received in said bearing bores of said first yoke arm, said first bearing bushing being closed by a base to which a retaining element is arranged, said retaining element including a retaining trunnion that projects outwardly from the base of the bearing bushing and is centered on the bore axis, said retaining trunnion having a circumferential groove formed therein; and a securing element which cooperates with said retaining element to hold said first bearing bushing axially in an unmovable manner relative to said first yoke arm, said securing element including an arc portion that forms an arc-like engagement portion that extends within the groove of the bulge formed as a circular arc groove, a pair of retaining portions that extend within the circumferential groove of the retaining trunnion, and a pair of connection portions that respectively connect the retaining portions to the arc portion, wherein an eyelet for the engagement of a tool is provided on free ends of each of the retaining portions.

* * * * *